UNITED STATES PATENT OFFICE.

GEORGE HAND SMITH, OF ROCHESTER, NEW YORK.

IMPROVED PROCESS OF MAKING STEEL DIRECT FROM THE ORE.

Specification forming part of Letters Patent No. 11,338, dated July 18, 1854; Reissue No. 2,334, dated August 14, 1866.

DIVISION NO. 2.

*To all whom it may concern:*

Be it known that I, GEORGE HAND SMITH, of Rochester, in the county of Monroe and State of New York, have Invented a new and useful Process for Making Cast-Steel Direct from the Ore; and I do hereby declare that the following is a full, clear, and exact description thereof.

My invention consists in combining with and preparatory to the well-known process of making cast-steel from blistered steel by melting in crucibles the process of deoxidizing and carbonizing iron ores by treating the ore in a comminuted state with charcoal or other equivalent carbonaceous matter, and with or without other flux, depending on the nature of the ore, in a close cementing oven, muffle, retort, or other equivalent vessel, at a high degree of heat, so that when so converted and after having been separated from the impurities it can be melted in crucibles to produce cast-steel of the best quality.

By any of the known and suitable means the ore is crushed or otherwise reduced to lumps of about the size of forty to the inch (more or less) and then mechanically separated from the earthy and other impurities. Thus prepared the ore with charcoal or other equivalent carbonaceous matter is charged in a cementing-oven, such as is generally used in making blistered steel, or it may be charged in a retort, or a muffle, or equivalent closed vessel in which it can be properly heated.

The ore and charcoal or other equivalent carbonaceous matter are charged in alternate layers of about one inch and a half, (more or less,) and when the ore is of such a composition as to require it other flux should be mixed with the ore. The charge so prepared is then to be heated to what is termed a "white heat," and continued at that heat until the ore shall have been reduced to the metallic state and properly carbonized or converted.

For a low grade of steel it will take about forty-eight hours from the time the carbon begins to unite with the iron, but a longer time will be required for higher grades of steel. With a cementing-oven well constructed and with a fire well managed the whole process of conversion from the first starting of the fire may be completed in six days, the greatest proportion of the time being consumed in heating the oven and bringing up the charge to the required white heat or welding heat, which is below that of fluidity, as the object is to avoid melting the particles of metal or the complete fusion of the mass during the process of conversion.

The mode of testing the degree of carbonization is by the color of the surface of the ore. When properly charged with carbon for steel of a moderate grade of temper the ore in cooling will assume a blue and yellow color and combinations of these somewhat resembling a brown; but if charged for a grade of high temper it will assume a gray color. By taking out portions of the ore the operator can tell by the colors when the required degree of temper has been reached.

During the converting process the particles of metal become united into a sheet by partial welding and by the earthy impurities present in the ore, and by the flux, if any be used, and, as the ore and carbon are charged in alternate layers, this partial union of the particles prevents the particles of coal from getting into the layers of ore and becoming mixed with them, so that after the converting process has been completed the converted ore can be removed separately from the coal, the presence of which would be a source of serious difficulty in the after part of the process.

When cooled and taken out of the oven the mass is to be broken or crushed, and, if desired, the metallic particles separated from the impurities by any of the known means for effecting such separation.

The ore after having been treated as above described is to be melted in crucibles and treated as in the well-known mode of making cast-steel from blistered steel.

It is not deemed necessary to describe or name the various kinds of flux which may be used in addition to the carbon in the converting process, as the necessity for and the kind to be used will depend upon the constituents of the ore to be treated and the properties other than the temper required to be imparted to the steel, as all these are known to ironmasters and are foreign to my invention, which relates simply to the process of converting iron ore directly into steel.

What I claim as my invention, and desire to secure by Letters Patent, is—

The combination of the process of deoxidizing iron ore and carbonizing the metallic particles, substantially such as herein described, with the process of melting in crucibles, substantially as and for the purpose described.

GEORGE HAND SMITH.

Witnesses:

WM. H. BISHOP,

ANDREW DE LACY.